United States Patent [19]

Hudson, Jr.

[11] 4,234,328
[45] Nov. 18, 1980

[54] OIL SEPARATOR DEVICE

[75] Inventor: Sharon J. Hudson, Jr., Toledo, Ohio

[73] Assignee: Sharon Manufacturing Company, Toledo, Ohio

[21] Appl. No.: 19,886

[22] Filed: Mar. 12, 1979

[51] Int. Cl.³ .......................................... B01D 45/12
[52] U.S. Cl. ...................................... 55/447; 55/319; 55/466; 55/201
[58] Field of Search ................. 55/201, 337, 410, 447, 55/456, 457, 466, 319

[56] References Cited

U.S. PATENT DOCUMENTS

| | | | |
|---|---|---|---|
| 1,110,461 | 9/1914 | Searle | 55/410 |
| 1,328,642 | 1/1920 | Xardell | 55/457 |
| 1,727,733 | 9/1929 | Stovall | 55/201 |
| 2,511,713 | 6/1950 | Hoyle et al. | 55/457 |
| 2,903,087 | 9/1959 | Glasgow | 55/201 |
| 3,251,176 | 5/1966 | Gleason | 55/457 |
| 3,296,779 | 1/1967 | Daman et al. | 55/337 |
| 3,747,309 | 7/1973 | Meier et al. | 55/466 |
| 4,092,137 | 5/1978 | Howe et al. | 55/337 |

Primary Examiner—David L. Lacey

[57] ABSTRACT

An oil separator device for use in an automotive crankcase ventilating system. The separator comprises a cannister shell which is made of two shell members and contains upper and lower partitions that define top, bottom and intermediate chambers. When oil laden gaseous fluid is introduced to the intermediate chamber it is directed by a vane member to flow in an orbital path around the intermediate chamber and create a vortex region in the central portion of the chamber. Gaseous liquid with oil removed flows out of the intermediate chamber into the upper chamber via a perforated chimney located in the vortex region. Oil drains from the intermediate chamber into the bottom of the lower chamber through an elongated aperture in the lower partition outside the vortex region.

13 Claims, 18 Drawing Figures

OIL SEPARATOR DEVICE

BACKGROUND OF THE INVENTION

Under present day regulations the crankcase fumes of internal combustion engines must not be vented to the atmosphere. They are generally circulated in a loop from the crankcase back into the engine along with fresh combustion air. A problem is presented when the crankcase fumes are laden with a quantity of oil vapors and mist sufficient to alter the combustion of a fuel-air charge delivered to a cylinder. To alleviate the problem means must be provided for removing a major portion of the oil mist and vapor from the crankcase fumes prior to their being circulated into the combustion air intake.

Accordingly it is a principal object of this invention to provide a simple apparatus which will effectively remove a substantial portion of the oil from a stream of crankcase fumes so that the gaseous portion of the fumes may be united with fresh combustion air and cycled through the combustion system and preferably separate the oil from the fumes with a minimum of pressure drop.

SUMMARY OF THE INVENTION

Generally speaking this invention relates to a separator device for removing the liquid from a gas-liquid stream. More specifically it relates to a device for separating oil from oil laden automotive crankcase fumes. The oil separator comprises a cannister with interior partitions which divide the cannister into top, intermediate and bottom chambers. The intermediate chamber is the largest of the three chambers and is the one into which the crankcase fumes are introduced first. It contains a vane which directs the incoming fume stream away from the center of the chamber towards it periphery and causes the fumes to swirl around in the chamber creating a vortex region in the center of the chamber. Oil is separated from the crankcase fumes in the intermediate chamber and gravitates to the bottom thereof where it flows downward through an aperture in the lower partition adjacent to the periphery of the partition into the lower chamber and ultimately out of the cannister through a drain aperture in the bottom. The gaseous portion of the fumes flows up through an outlet in the top center of the intermediate chamber into the top chamber where it exits the top chamber through an outlet.

DETAILED DESCRIPTION OF THE INVENTION

Each of the three oil separator embodiments illustrated in drawings is basically similar to the other in structure and the manner in which it functions. For the sake of brevity the basic features will be explained primarily with respect to the embodiment shown in FIGS. 1-7 and it is to be understood that the explanation applies to the other embodiments except where the contrary is made apparent by the drawings or description. The oil separator 20 comprises a cannister made of two sheet metal shell members 22, 24 having the shape of oblong open pans with rounded ends. The shell members have peripheral flanges 26, 28 which interfit with one another to hold the members in a fixed position relative to each other. Preferably the flanges 26, 28 are designed for copper brazing and one of them is provided with an upright rim 30 to aid in the brazing operation. One end of a horizontally disposed external tubular member denoted the gas outlet tube 32 protrudes into the top chamber through a collared aperture in the front end of the top shell member 22 offset to one side of its center and at a midway elevation. The bottom shell member 26 has a greater depth than the top shell member 22 and it contains a bottom aperture for a tubular assembly 34 that comprises the crankcase fume inlet tube 36 and the oil return drain tube 38.

Preferably the fume inlet and oil return passages are formed by placing one tubular member 36 inside another 38 of substantially larger diameter. The inner tube 36 may be offset to one side of the outer tube 38 as shown in FIGS. 1, 3, 6 and 7. The outer tubular member may have a necked down lower end 40 with a tapered shoulder 42 separating it from the larger diameter upper end 44. The smaller diameter end 40 is sized to have a slip fit with respect to an engine vent aperture (not shown) communicating with the crankcase into which it is to be inserted and the larger diameter upper end 44 is sized to have an interference fit therewith. The inner tubular member denoted the fume inlet tube 36 extends from a short distance beyond the lower end of the outer tubular member 38 up through the cannister to the inside surface of an outwardly protruding embossment 46 in the top of shell member 22. Beginning at a level slightly above the bottom of the cannister, the lower end of the fume inlet tube is flattened as at 48 or grooved on the side opposite from the side in contact with the outer tubular member 38 thus enlarging the center portion of the cresent shaped cross sectional opening which constitutes the oil return passageway between the two tubes (see FIGS. 3, 6 and 7).

Figure 1:
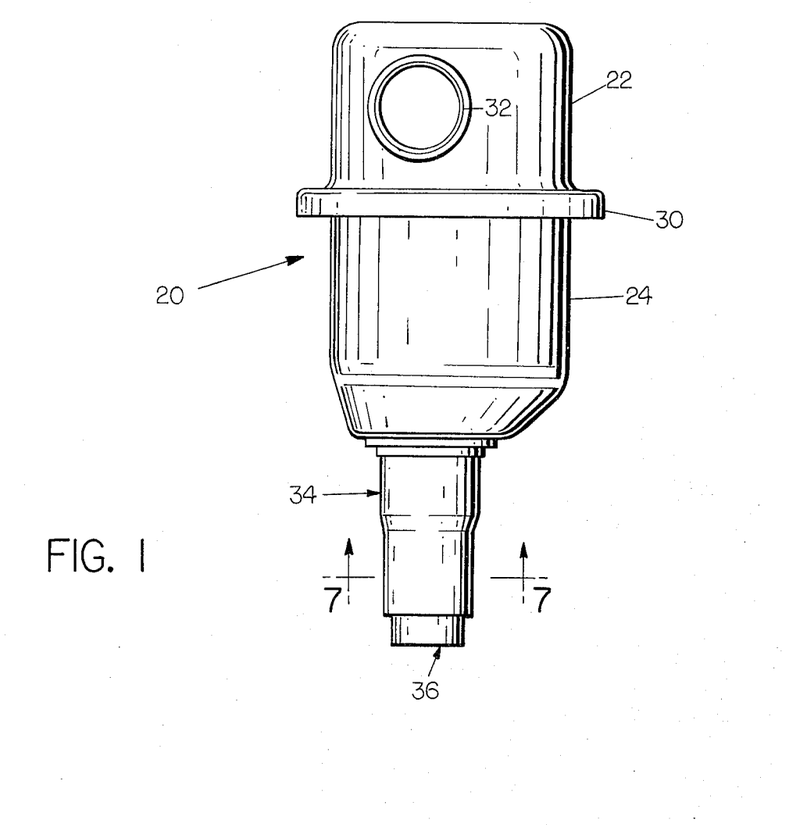
FIG. 1 is an end view of an oil separator embodiment made in accordance with the teachings of this invention showing the external features of the cannister.
Figure 2:
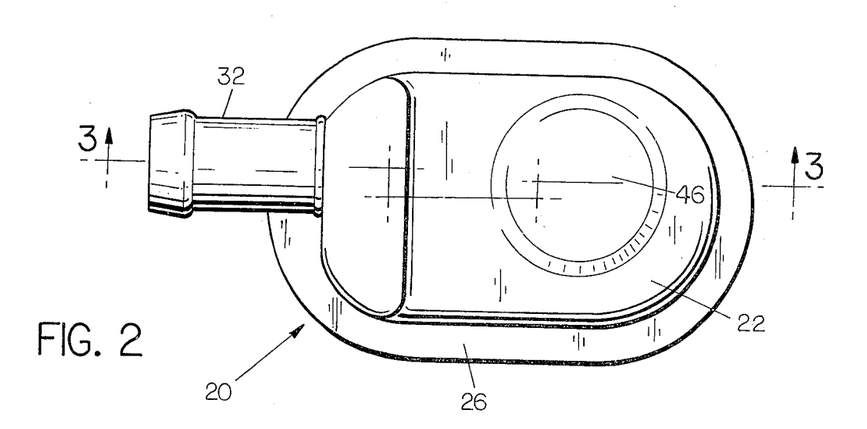
FIG. 2 is a plan view of the embodiment of FIG. 1.
Figure 3:
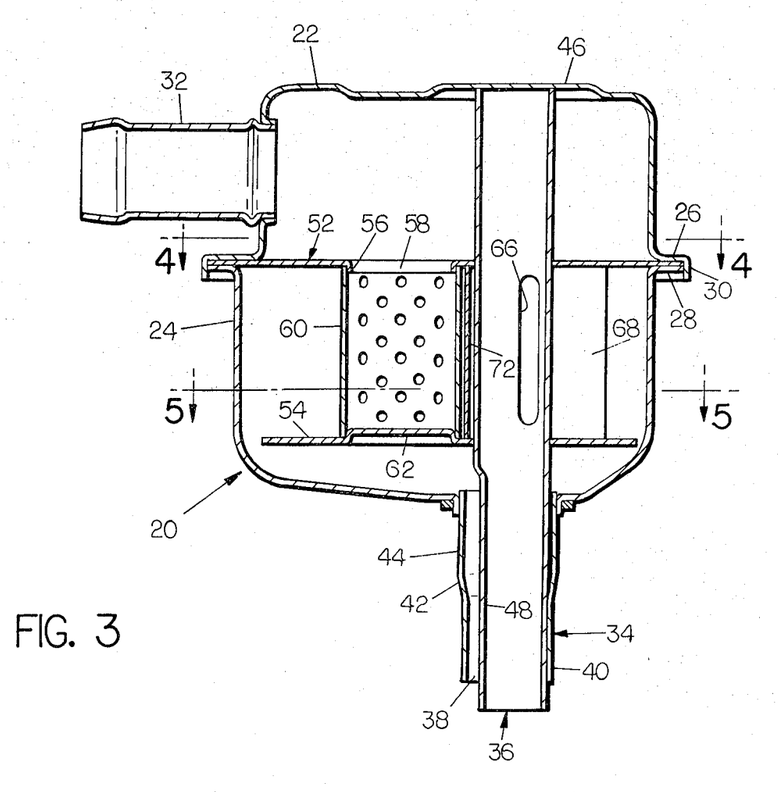
FIG. 3 is a cross sectional view of the oil separator of FIG. 1 taken along lines 3—3 of FIG. 2 thereof showing internal details.
Figure 4:
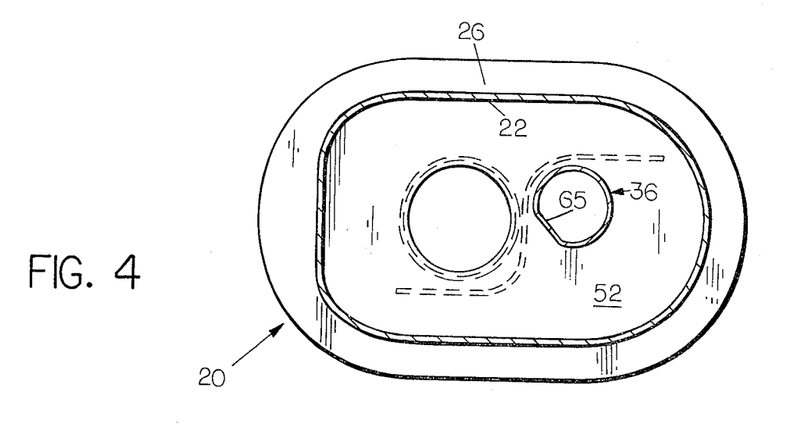
FIG. 4 is a cross sectional view taken along lines 4—4 of FIG. 3 showing the interior of the top chamber.
Figure 5:
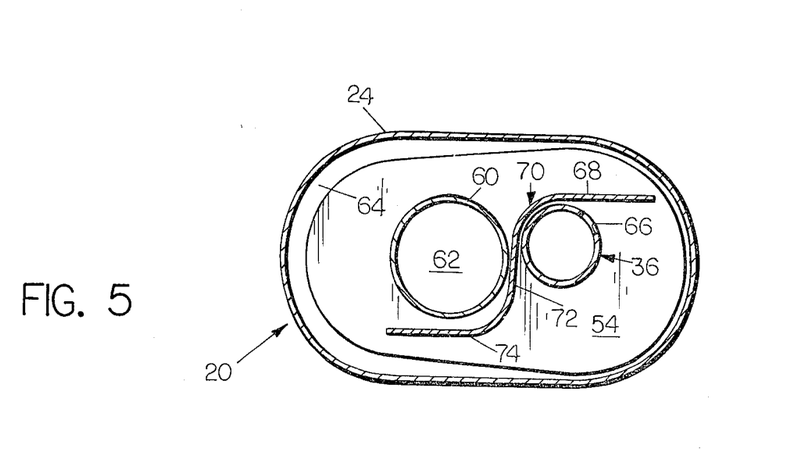
FIG. 5 is a cross sectional view taken along lines 5—5 of FIG. 3 showing the interior of the intermediate chamber.
Figure 6:
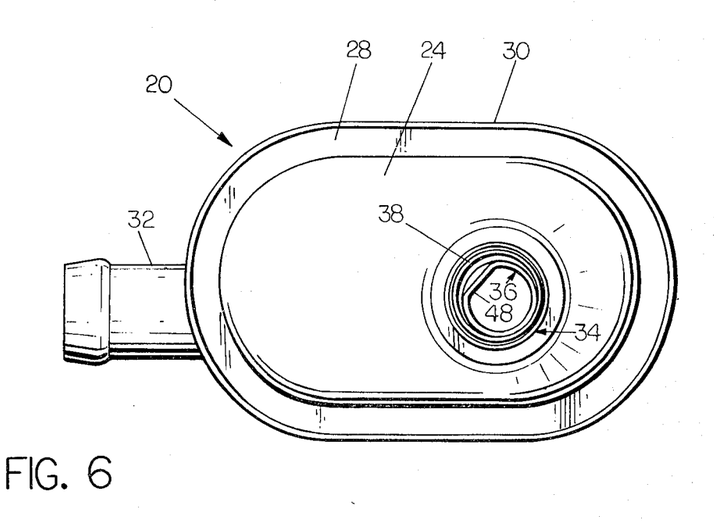
FIG. 6 is a bottom view of the embodiment shown in FIG. 1.
Figure 7:
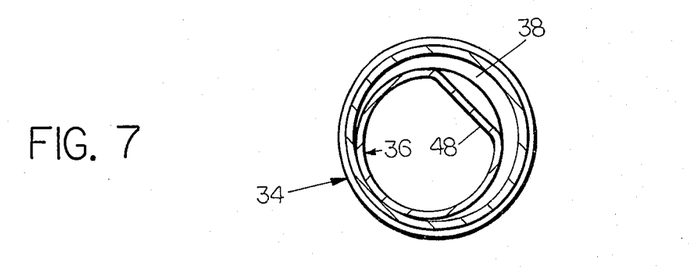
FIG. 7 is an enlarged cross sectional view taken along lines 7—7 of FIG. 1 showing features of the tubular assembly forming the crankcase fumes inlet and the oil return.

Two generally planar vertically spaced apart partitions 52, 54 divide the cannister interior into three chambers, namely the top, intermediate and bottom chambers. The upper partition 52 extends across the cannister at the level of the seam joining the cannister shell members 22, 24 together and has its periphery sandwiched between seam flanges 26, 28. An aperture 56 centered on the longitudinal centerline of the oblong cannister slightly forward of a midway position has a downwardly extending peripheral collar 58 which fits on the inside of and secures the upper end of a perforated or foraminous cylindrical chimney member 60. The lower end of chimney 60 is secured in position by a raised circular embossment 62 in the lower partition 54 located directly beneath aperture 56 in the upper partition 52. A major portion of the periphery of the lower partition 54 is spaced away from the adjacent shell wall to produce a tapered U shaped opening 64 around the front and along a portion of the sides of the cannister as can be seen in FIG. 5 so that oil accumulating on the walls of the intermediate chamber can drain down into the bottom chamber where it eventually flows into the oil return passageway 38 back into the crankcase. The aforementioned fume inlet tube 36 is snugly fitted in vertically aligned holes in the partitions 52, 54. The top portion of tube 36 may have a flat side 65 which corresponds to a flat in the aperture in partition 52 and serves to fix it in an appropriate rotational position. Oil laden crankcase fumes enter the cannister through the fume inlet pipe 36 and flow upward to an elongated outlet slot 66 located approximately midway between the ends of the tube. The elongated slot 66 extends vertically over substantially the entire heigth of the intermediate chamber and is directed towards the rear end of the chamber.

One leg 68 of an S-shaped vane member 70 is disposed between the elongated outlet 66 and the cannister side wall so that it deflects the outflowing fume stream towards a curved section of the rear wall where the stream begins its orbital path around the inside of the cannister. The intermediate portion 72 of the vane member 70 passes between the fume inlet tube 36 and the chimney 60. The opposite end leg 74 of the S shaped vane member 70 extends between the chimney 60 and a side wall of the cannister so that the chimney is in a pocket on the lee side or in the shadow of the vane 70 as can be seen best in FIG. 5.

The oil separator embodiment 120 shown in FIGS. 8-14 has a proportionately deep top shell member 122 and a relatively shallow bottom shell member 124. The two shell members are joined together by means of overlapping peripheral seam edges 126, 128 as seen best in FIG. 10 rather than the face to face lateral flange seams of the earlier described embodiment. Two partitions 152, 154 divide the interior of the separator cannister into top, intermediate and bottom chambers but only the lower partition 154 is flat and the peripheral edges of both partitions are sandwiched between the shell members at the seam. The upper partition 152 is shaped like the top shell member 122 but it is shorter in heigth. Its bottom periphery and rear half conform to the shape of the shell. The top panel 153 of the partition 152 is circular and the front half 155 slopes outwardly so that the top chamber is relatively shallow except for a downwardly converging wedge shaped front section as can be noted in FIGS. 10 and 12. Also the outlet tube 132 is located in close proximity to the top of the shell member 122. The top panel 153 of the upper partition member 152 has an outlet aperture or port 156 located slightly towards the front and one side of the panel. The generally circular port 156 is centered on an extension of the axis of outlet tube 132. The fume inlet tube 136 opens into the upper partition 152 and is located between aperture 156 and the rear wall of shell member 122. It is of smaller diameter than the outlet aperture 156 and corresponds to the cross sectional size and shape of the fume inlet tube 36 which has a flat on one side. The two apertures are spaced from one another by a narrow annular web segment 157 which extends into the rear side of circular outlet aperture 156.

The lower partition 154 is planar and has a cresent shaped oil drain aperture 164 and an aperture which corresponds to the size and shape of the fume inlet tube 136 at the rear of the partition. The inside surfaces of the two partitions 152, 154 define the intermediate or oil separating chamber.

Figure 13:
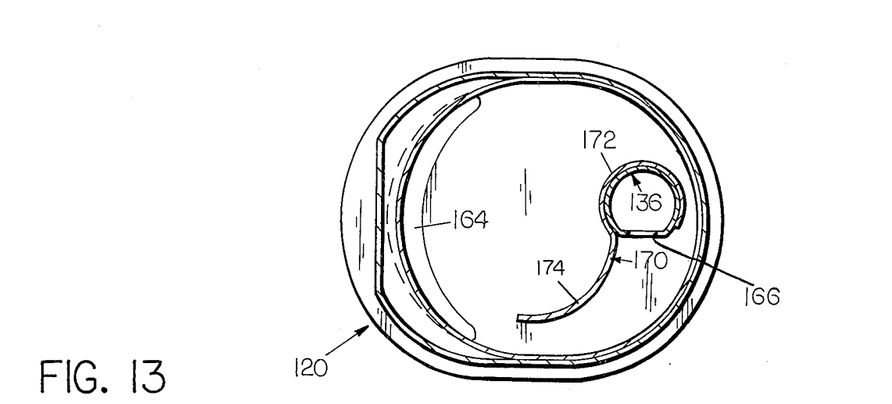
FIG. 13 is a cross sectional view taken along lines 13—13 of FIG. 10 showing details of the intermediate chamber.

The vane member 170 located inside the separating chamber has a base section 172 which embraces the circular portion of the fume inlet tube 136 and an arcuate working section 174 which extends from the front side of the flat section of the tube towards the side and front of the chamber to direct the incoming oil laden crankcase fumes in an arcuate path around the chamber from the fume inlet aperture 166 in the flat section of the fume inlet tube (see FIG. 13). This creates a vortex region in the central portion of the chamber where the fume outlet is located.

Figure 8:
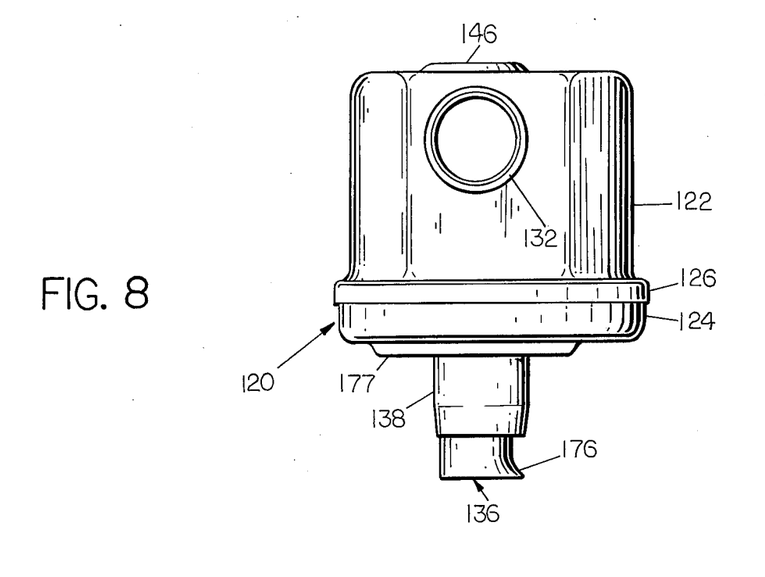
FIG. 8 is an end view of a second embodiment of an oil separator of this invention.
Figure 9:
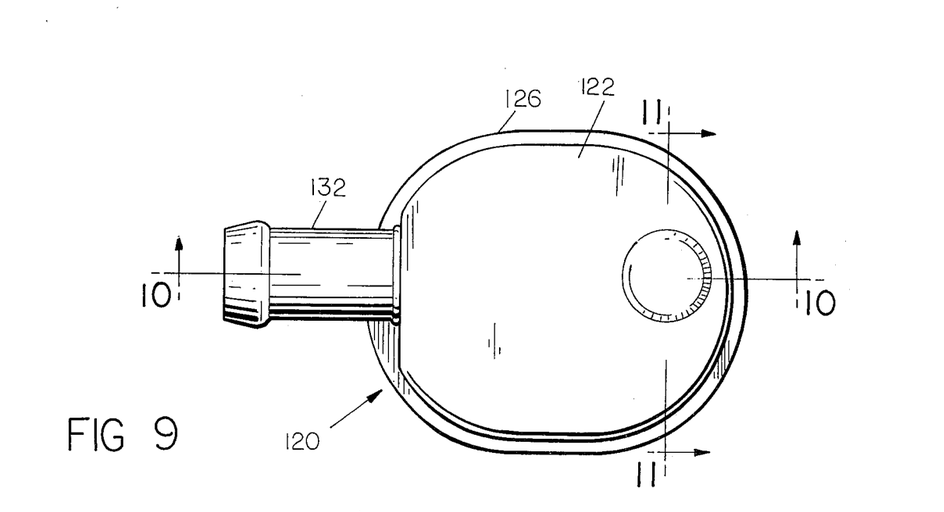
FIG. 9 is a plan view of the FIG. 8 embodiment.
Figure 10:
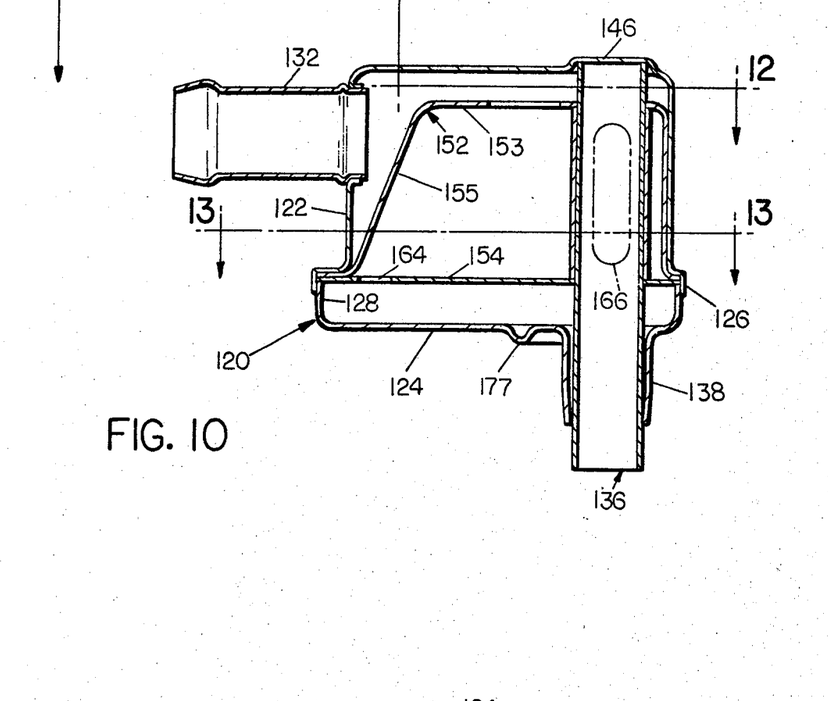
FIG. 10 is a cross sectional view taken along lines 10—10 of FIG. 9 showing interior details of the oil separator.
Figure 11:
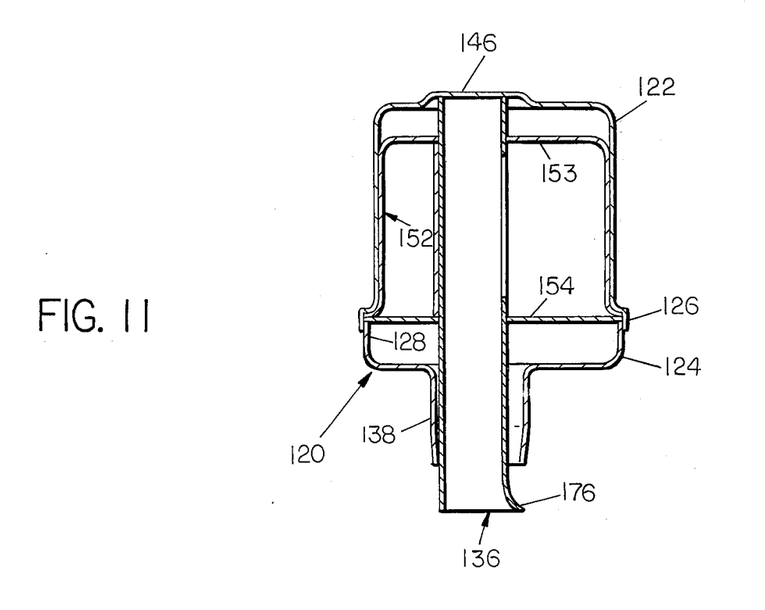
FIG. 11 is a cross sectional view taken along lines 11—11 of FIG. 9.
Figure 12:
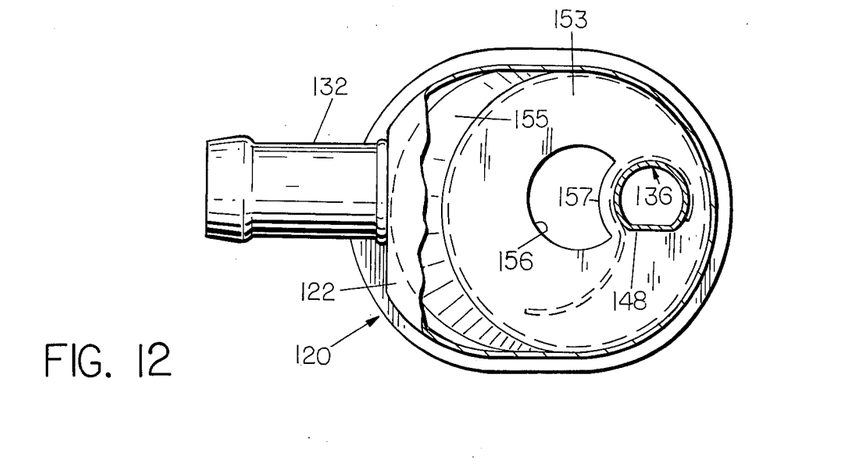
FIG. 12 is a cross sectional view taken along lines 12—12 of FIG. 10 showing details of the top chamber.
Figure 14:
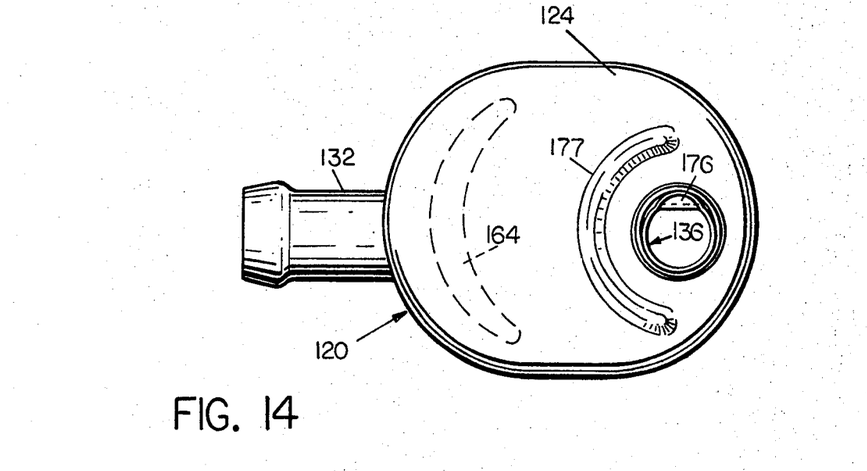
FIG. 14 is a bottom view of the embodiment of FIG. 8.
Figure 15:
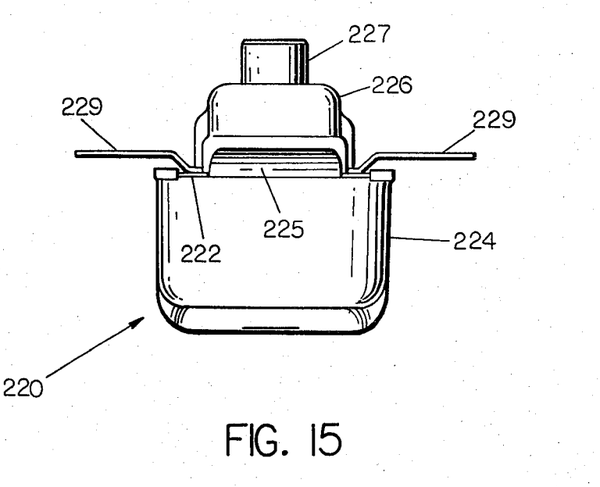
FIG. 15 is an end view of a third embodiment of an oil separator of this invention designed to be mounted inside an automotive engine rather than externally.
Figure 16:
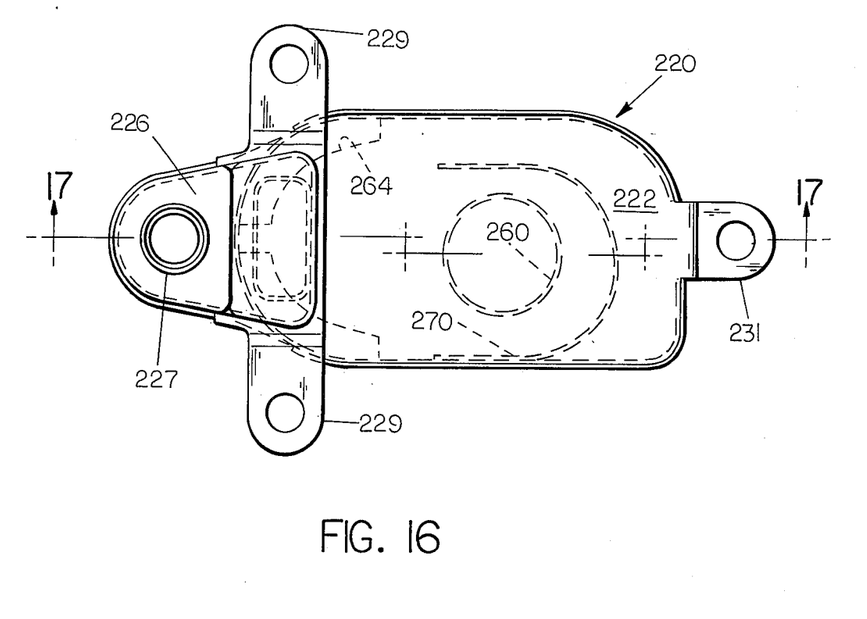
FIG. 16 is a plan view of the embodiment of FIG. 15.
Figure 17:
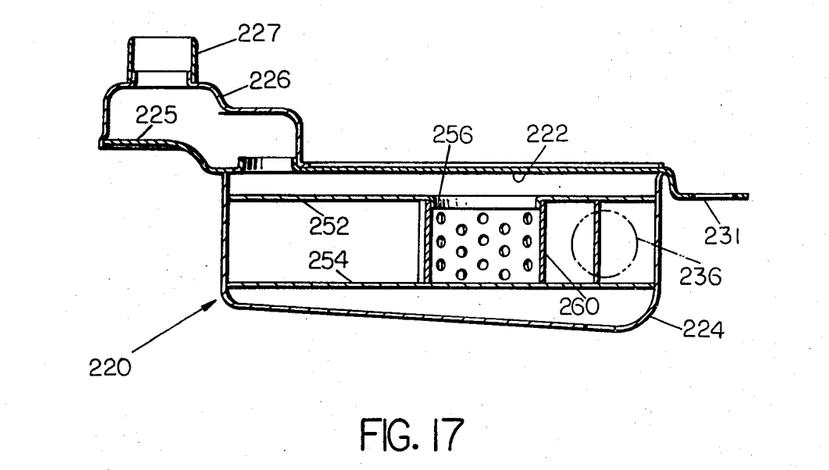
FIG. 17 is a cross sectional view taken along lines 17—17 of FIG. 16.
Figure 18:
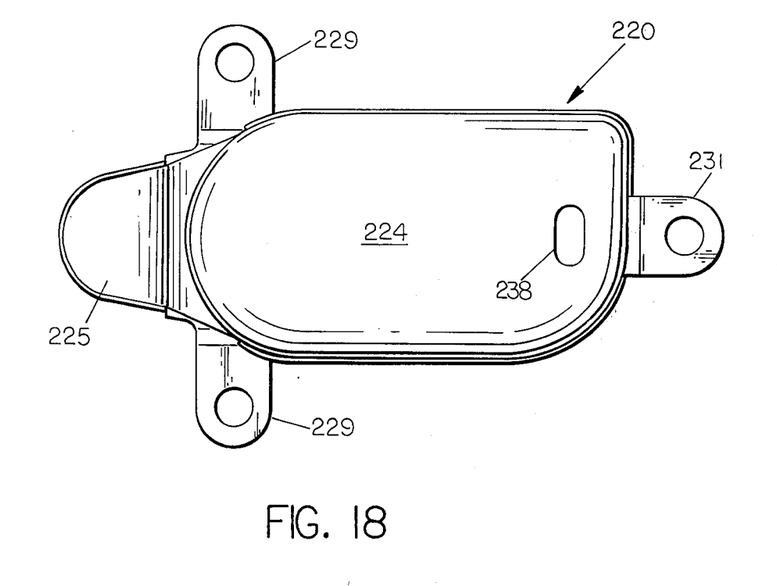
FIG. 18 is a bottom view of the embodiment of FIG. 15.

The fume inlet tube 136 extends from a point below the bottom end of the tubular extension 138 of the bottom shell member 124 to the inside surface of the circular embossment 146 in the top of the top shell member 122. It has a flat 148 facing one side of the cannister and which extends from the top to the bottom end of the tube 136 except for an outwardly flared portion 176 on one side at its bottom tip as shown in FIGS. 8, 11 and 14. The flared portion 176 directs the oil laden fumes into the inlet tube 136 and prevents them from flowing directly into oil return passageway defined by the outside surface of tube 136 and the inside surface of the extended tubular extension 138. Tubular extension 138 is an integral part of shell member 124 rather than being a separate tubular part. A cresent shaped groove 177 in the bottom of shell member 124 surrounds the front half of the top of extension 138.

The embodiment 220 illustrated in FIGS. 15-18 is adapted for mounting inside the engine as opposed to the earlier described embodiments which are for mounting outside. Its overall heigth is proportionately less than the other two embodiments and it has a more rectangular shape. The top shell member 222 is in the form of a generally flat cover plate with an extruded rectangular outlet aperture adjacent to its front end. Forward of the outlet aperture is an extension 225 which protrudes beyond the end of the bottom shell member 224. This extension 225 forms the bottom portion of a small outlet plenum. The top portion of the plenum is formed by a separate stepped dome member 226 sealed over the outlet aperture and around the stepped extension 225 of the top shell member 222. The dome member 226 has an outlet aperture with an extruded collar over which is mounted a short nipple connector 227. A pair of integral mounting bracket arms 229 extend in opposite directions from the dome member 227. A third mounting bracket arm 231 extends from the rear end of the top shell member 222. The bottom shell member 224 is a dished member with vertical sidewalls integrally connected through radiused corners to a planar bottom panel which is inclined downwardly from the front to the back end. At the bottom of the rediused corner of the rear wall is an outlet aperture comprising the oil drain outlet 238. The fume inlet 236 is located at an intermediate level adjacent to the rear end of one of the sidewalls of shell member 224. A narrow peripheral ledge around the top of shell member 224 is provided to receive the cover member 222 forming the oil separator cannister. The interior of the cannister is divided into three chambers by two generally planar vertically spaced apart horizontally disposed partitions 252, 254. The upper partition 252 has a circular fume outlet aperture with a downwardly extending collar 256 that fits snugly inside a vertically disposed cylindrical chimney 260. It is located slightly off center towards the rear end and towards the sidewall containing the fume inlet aperture 236. The lower partition 254 has a U-shaped aperture divided into two equal segments by a narrow tab projecting to the center of the front wall of shell member 224 as shown in dashed lines in FIG. 16. A U-shaped vane member 270, which performs substantially the same function as vane member 70 or 170, has one leg affixed to the sidewall containing the fume inlet aperture 236. The vane member 270 is located such that it shades the chimney 260 from the fumes entering the intermediate chamber and causes them to flow away from the center towards the outside of the chamber.

Except for certain of the tubular members the components of these oil separator embodiments are made from sheet metal by stamping processes and are designed to be easily assembled and bonded together by copper furnace brazing in a protective atmosphere.

While the oil separator of this invention has been described with respect to three specific embodiments it is to be understood that modifications or other alternatives will become apparent to those skilled in the art without departing from the scope of this invention which is defined primarily by the appended claims.

What is claimed is:

1. A device for separating oil from a stream of oil laden gaseous fumes, said device comprising: a cannister, upper and lower partition members inside said cannister dividing its interior into top, intermediate and bottom chambers, a oil laden fume stream inlet tubular member which extends from below the cannister bottom through all three chambers to the top of the cannister said stream inlet member has an elongated side aperture which opens into said intermediate chamber and extends from adjacent to the upper partition to adjacent to the lower partition, a vane means in said intermediate chamber for directing said stream towards the outer portions of the intermediate chamber away from the center to produce a vortex region in said center, an aperture in the upper partition above the vortex region, an elongated opening in the lower partition adjacent to the cannister sidewall, a tubular oil drain outlet from the bottom chamber and a tubular fume outlet from the top chamber.

2. A device according to claim 1 wherein an upright fume permeable chimney extends from said aperture in said upper partition downwardly to said lower partition.

3. A device according to claim 2 wherein said chimney is a perforated cylinder and at least one of said partitions has male means for securing said chimney in position.

4. A device according to claim 1 wherein said tubular oil drain outlet surrounds said fume inlet tubular member and has an internal diameter that is greater than the outside diameter of said inlet tubular member.

5. A device according to claim 4 wherein said inlet tubular member is positioned in contact with one side of the oil drain tubular member.

6. A device according to claim 5 wherein the side of said inlet tubular member opposite from the side in contact with said tubular outlet drain member is displaced inwardly and said inlet tubular member has means for orienting said tubular members relatively such that said displaced side is opposite from said contacting side.

7. A device according to claim 6 wherein said inlet tubular member extends below said tubular outlet drain member and its tip is flared outwardly on the inwardly displaced side.

8. A device according to claim 1 wherein said vane means is connected to said inlet tubular member.

9. A device according to claim 1 wherein said cannister is made of two shell members joined together at their peripheries and the periphery of at least one of said partition members is sandwiched between the edges of said shell members at the joint.

10. A device according to claim 9 wherein said upper partition is in the form of an inverted cup and the peripheries of both partitions are sandwiched between the edges of the shell members at the joint.

11. A device for separating oil from a stream of oil laden gaseous fumes, said device comprising: a cannister made of top and bottom shell members joined together along their peripheral edges, upper and lower partitions members inside said cannister dividing its interior into top, intermediate and bottom chambers, a tubular oil laden gaseous fume stream inlet member extending vertically from below the bottom of the cannister through all three chambers to the inside surface of the top shell member, a vertically disposed slot in said tubular member extending from adjacent one partition to adjacent to the other for introducing said fume stream to said intermediate chamber, a vane means in said intermediate chamber for directing said stream towards the outer portions of the intermediate chamber away from the center to produce a vortex region in said center, an aperture in the upper partition above the vortex region, an elongated opening in the lower partition adjacent to the cannister sidewall, an outer tubular member extending downwardly from the bottom chamber and disposed around said tubular fume inlet member, an oil drain defined by the inner surface of said outer tubular member and the outer surface of said inner tubular member and a tubular fume outlet from said top chamber.

12. A device according to claim 11 wherein an upright fume permeable chimney extends from said aperture in said upper partition downwardly to said lower partition, each of said partitions having means for securing said chimney in position below said aperture.

13. A device according to claim 11 wherein said vane means is connected to said fume inlet tubular member.

* * * * *